United States Patent [19]

Nagano et al.

[11] 4,115,851

[45] Sep. 19, 1978

[54] MEMORY ACCESS CONTROL SYSTEM

[75] Inventors: Genzo Nagano, Yokohama; Hiroshi Nakamura, Kawasaki; Yukio Sohma, Yokohama, all of Japan

[73] Assignee: Fujitsu Limited, Kawasaki, Japan

[21] Appl. No.: 785,104

[22] Filed: Apr. 6, 1977

[30] Foreign Application Priority Data

Apr. 24, 1976 [JP] Japan ................... 51/47039

[51] Int. Cl.$^2$ ............................................. G06F 13/00
[52] U.S. Cl. ...................................................... 364/200
[58] Field of Search ... 364/200 MS File, 900 MS File

[56] References Cited

U.S. PATENT DOCUMENTS

| 3,967,246 | 6/1976 | House | 364/200 |
|---|---|---|---|
| 3,997,875 | 12/1976 | Broeren | 364/200 |

*Primary Examiner*—Raulfe B. Zache
*Attorney, Agent, or Firm*—Staas & Halsey

[57] ABSTRACT

A memory access control system is provided between one or more accessing devices and a main memory composed of a plurality of independently accessible logical storages, and receives a request from the accessing device and, based on the status of the main memory, permits access to one of the logical storages. The memory access control system comprises a shift register, composed of stages corresponding to the cycle time of the main memory, for storing address information sufficient for identifying a busy one of the logical storages and for sequentially shifting the stored content in synchronism with a clock signal, and a comparator circuit for comparing the content of each stage of the shift register with address information of the logical storage designated based on the request from the accessing device, receiving the request based on the result of the comparison, and generating a control signal for accessing the designated logical storage. Using the shift register, one of the logical storages to be accessed can be checked whether it is busy or not, so that even if the number of logical storages is increased with an increase of the capacity of the main memory, the scale of the memory access control system is not enlarged. The shift register also has stored therein the codes of operations, the codes of the accessing devices, etc., and is capable of identifying the accessing device to which data read out from the main memory is to be sent back, and of achieving a partial write control.

12 Claims, 5 Drawing Figures

MEMORY ACCESS CONTROL SYSTEM

BACKGROUND OF THE INVENTION

1. Field of the Invention

This invention relates to a memory access control system, and more particularly to a memory access control system which employs a shift register storing address information of a memory unit (hereinafter referred to as a logical storage) in its busy state, and is capable of controlling the reception of a request for access with a simple construction, even in the case where the number of independently accessible logical storages is increased.

2. Description of the Prior Art

In such a multiprocessor system in which, for example, a large capacity storage is shared by a plurality of accessing devices (that is, central processing units and/or channel processors) to increase the throughput by multiple processing of requests from the accessing devices, the wait times of the accessing devices are shortened by forming the large capacity storage with a plurality of independently accessible logical storages and increasing the number of logical storages. There has been known in the art a memory access control system of the type in which flip-flops are provided to have one to one correspondence to the logical storages, and the status of each logical storage is checked based on the content of each flip-flop and receives the request for access when the logical storage requested to be accessed is idle. In this type of memory access control system, however, it is necessary to increase the number of flip-flops with an increase in the number of logical storages. Accordingly, where a relatively large number of logical storages are provided, the overall control system becomes bulky.

SUMMARY OF THE INVENTION

One object of this invention is to provide a memory access control system whose scale can be retained small even where a relatively large number of logical storages are provided.

Another object of this invention is to provide a memory access control system in which the status of each logical storage is stored in a shift register having stages corresponding in number to the cycle time of a main memory, and wherein, even if the number of logical storages is increased, the number of stages of the shift register remains unchanged so as to hold the scale of the system small.

Another object of this invention is to provide a memory access control system in which information for identifying an accessing device is stored in a shift register and, when required data is read out from an accessed memory, the information for identifying the accessing device to which the read out data is sent back can easily be obtained by reading out the information from the shift register.

Still another object of this invention is to provide a memory access control system in which a partial write capability can readily be achieved.

Other objects, features and advantages of the present invention will hereinafter become more fully apparent from the following description taken in conjuction with the accompanying drawings.

DESCRIPTION OF THE PREFERRED EMBODIMENTS

Figure 1:
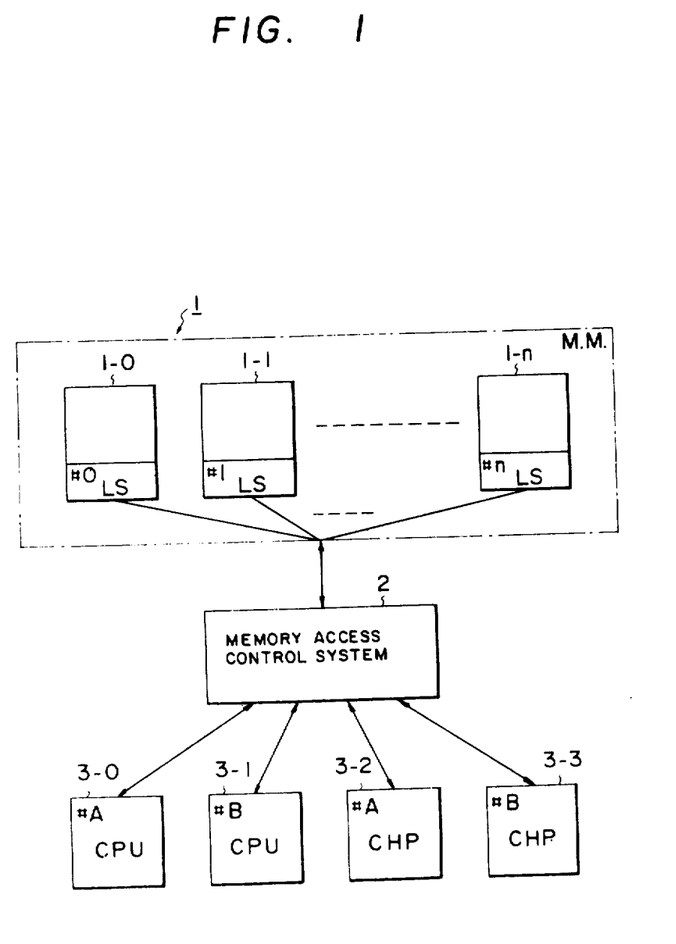
FIG. 1 is a block diagram illustrating an example of a multiprocessor system having a memory access control system.

FIG. 1 shows in block form the construction of an example of the multiprocessor system, and is used for generally explaining the memory access control system. In FIG. 1, reference numeral 1 indicates a main memory (M.M.); 1-0, 1-1, . . . 1-$n$ designate independently accessible logical storages (LS); 2 identifies a memory access control system; and 3-0, 3-1, 3-2 and 3-3 denote a central processing unit (CPUA), a central processing unit (CPUB), a channel processor (CHPA), each of and a channel processor (CHPB) which may access the main memory 1.

In general, the multiprocessor system has such a construction that the plurality of logical storages 1-0, 1-1, . . . 1-$n$ are shared by the plurality of accessing devices 3-0, 3-1, 3-2, and 3-3. Between the logical storages and the accessing devices there is provided the memory access control system 2, which receives requests from the accessing devices 3-0, 3-1, 3-2, and 3-3 so as to access the logical storages 1-0, 1-1, . . . 1-$n$.

In this case, the conventional memory access control system 2 has, in the prior art, included flip-flops in one to one correspondence to the logical storages 1-0, 1-1, . . . 1-$n$. The status of the logical storages 1-0, 1-1, . . . 1-$n$ is detected by the flip-flops and, based upon the results of the detection, requests from the accessing devices 3-0, 3-1, 3-2 and 3-3 are received.

Figure 2:
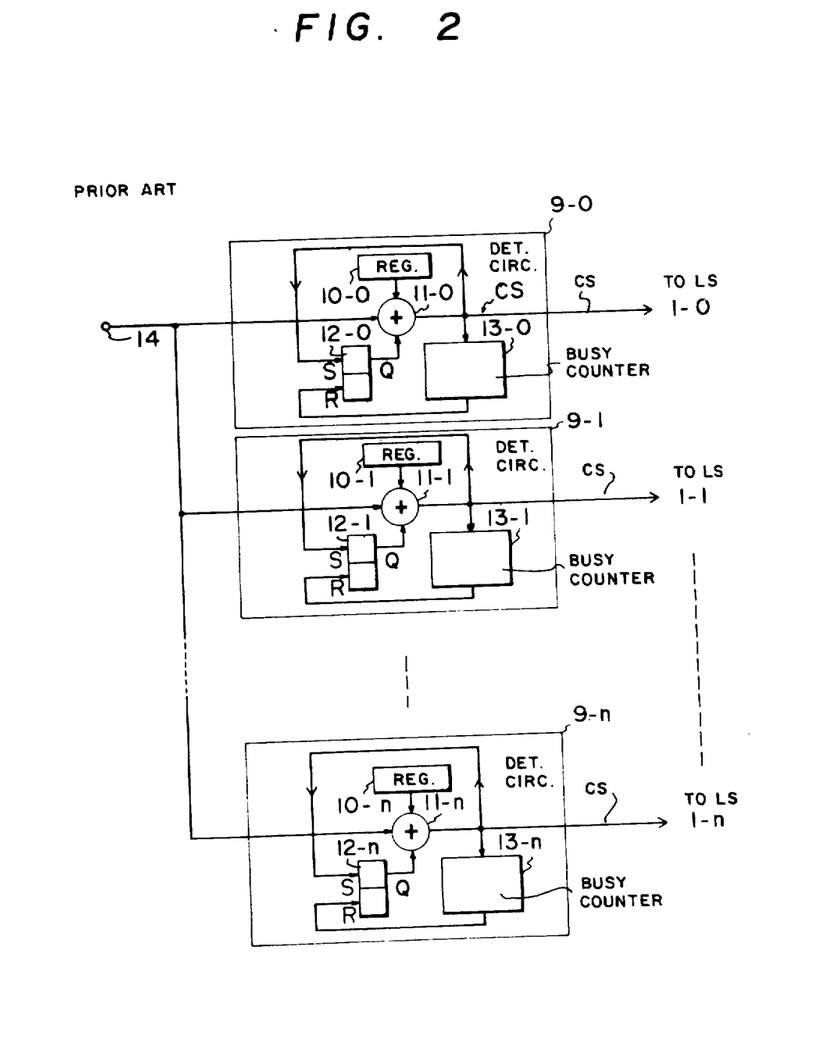
FIG. 2 is a block diagram showing an example of prior art memory access control systems.

Referring now to FIG. 2, a logical storage status detector in such a conventional memory access control system will be described.

In FIG. 2, reference numerals 9-0, 9-1, . . . 9-$n$ represent logical storage status detector circuits (DET. CIR.) which are provided corresponding to the logical storages 1-0, 1-1, . . . 1-$n$, respectively, and which form one part of the memory access control system 2 (FIG. 1). The status detector circuits 9-0, 9-1, . . . 9-$n$ respectively include registers 10-0, 10-1, . . . 10-$n$ for storing addresses of the logical storages, comparator circuits 11-0, 11-1, . . . 11-$n$ flip-flops 12-0, 12-1, . . . 12-$n$, and busy counters 13-0, 13-1, . . . 13-$n$. Thus, the status detector circuits 9-0, 9-1, . . . 9-$n$ are of the same construction.

When data of the address requested to be accessed is provided as an input from a terminal 14, it is distributed to the status detector circuits 9-0, 9-1, . . . 9-$n$. For example, in the status detector circuit 9-0, the data supplied thereto from the terminal 14 and the address of the logical storage stored in the register 10-0 are compared in the comparator circuit 11-0. Where the two data are coincident and the output Q from the flip-flop 12-0 (serving as a busy latch) is "0" (indicating that the corresponding logical storage is idle), the comparator circuit 11-0 derives therefrom a coincidence signal CS.

The coincidence signal CS is fed directly to the logical storage 1-0 through a control line so as to start the logical storage 1-0 access operation. The abovesaid coincidence signal CS is also fed to a terminal S of the flip-flop 12-0 to set it, providing its output Q in the form of "1" to produce a "busy" indication. Also, the coincidence signal CS is applied to the busy counter 13-0 to start it counting. While access to the logical storage 1-0 is achieved, the busy counter 13-0 counts clock pulses corresponding to the cycle time of the accessing and, upon completion of the counting, sends a signal to a terminal R of the flip-flop 12-0 to reset it, so that the output Q is altered to "0" to provide an "idle" indication.

Where the address supplied to the terminal 14 and the address stored in the register 10-0 are not coincident with each other, the coincidence signal CS is not produced, and even where they are coincident with each other, if the corresponding logical storage is busy, the output Q from the flip-flop 12-0 is "1" as described above, so that the coincidence signal CS is not generated and accessing is not permitted.

In the prior art arrangement described above, since the status detector circuits must be provided in one to one correspondence to the logical storages, it is necessary to increase the number of status detector circuits in proportion to an increased number of logical storages used.

For example, in the case where the main memory 1 (FIG. 1) comprises 64 logical storages 1-0, 1-1, . . . 1-63, 64 status detector circuits, each including one flip-flop, are required. Accordingly, the memory access control system 2 becomes inevitably bulky in accordance with the number of logical storages employed.

Figure 3:
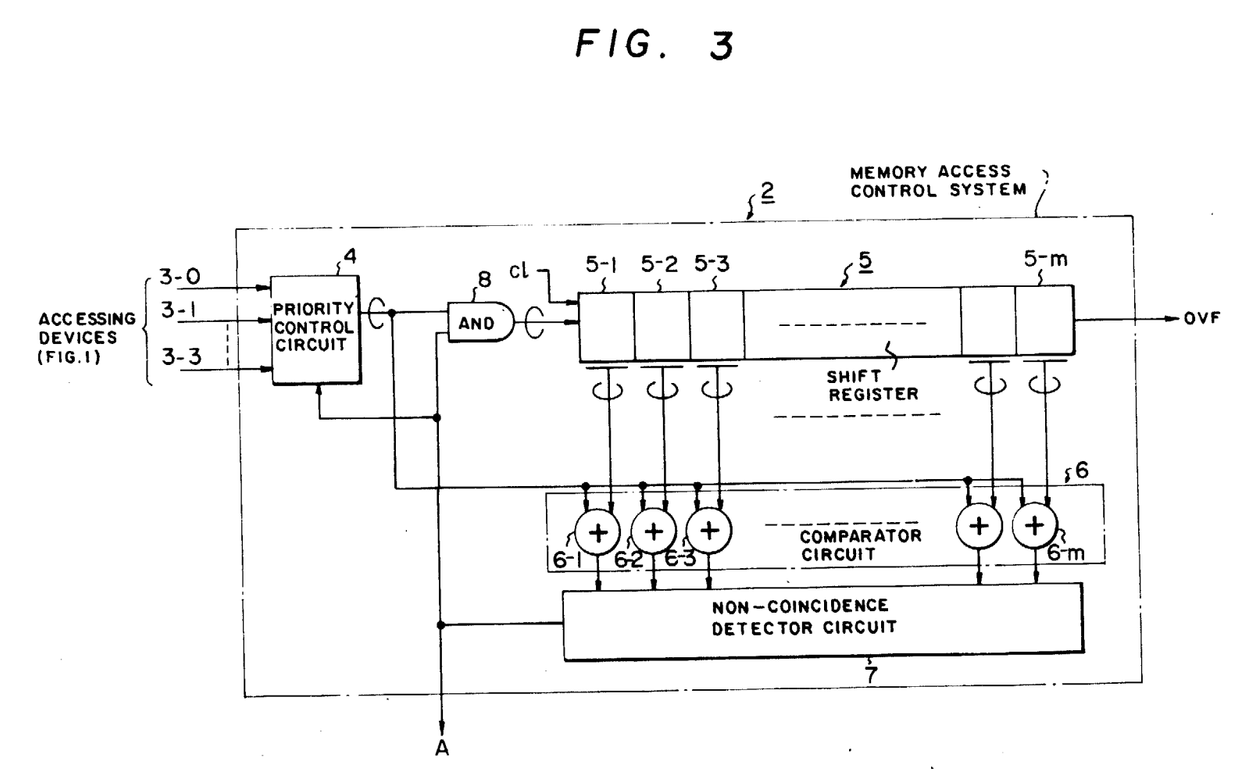
FIG. 3 is a block diagram explanatory of the principle of the memory access control system according to this invention.

FIG. 3 is a block diagram explanatory of the principle of the memory access control system of this invention.

In FIG. 3, reference numeral 2 indicates a memory access control system; 4 designates a priority control circuit, which determines the priority levels of requests for access inputted from two or more of the plurality of accessing devices 3-0 to 3-3 at substantially the same time; 5 identifies a shift register, which comprises shift register stages 5-1, 5-2, 5-3, . . . 5-m corresponding in number to clock signals of the cycle time of the main memory 1 (FIG. 1), and which stores address information of that or those of the logical storages 1-0, 1-2, . . . 1-n which is or are busy; 5-1, 5-2, 5-3, . . . 5-m denote the abovesaid shift register stages in which the stored contents are sequentially shifted to the right in synchronism with a clock signal cl; 6 represents a comparator circuit in which the address information designated by the request for accessing selected by the priority control circuit 4 is compared with the content stored in each of the shift register stages 5-1, 5-2, . . . 5-m 6-1, 6-2, 6-3, . . . 6-m show exclusive OR gates for performing the comparison function; 7 refers to a non-coincidence detector circuit which is, for example, an AND gate which produces a signal of logic "1" only when all the outputs from the exclusive OR gates 6-1, 6-2, . . . 6-m are of logic "1"; and 8 indicates an AND gate. The following will describe the operation of the memory access control system 2 in connection with the case where the accessing device 3-1 requests access to the logical storage 1-2.

The request for access from the accessing device 3-1 is supplied to the priority control circuit 4, and is given a priority level based on the relationship of device 3-1 to the other accessing devices 3-0, 3-2 and 3-3. Assuming that, at the moment when the request for access from the accessing device 3-1 is selected by the priority control circuit 4 which derives therefrom an output, the logical storage 1-2 designated by the request for access is being accessed, that is, in the "busy" condition, the address information of the designated logical storage 1-2 is already stored in one of the shift register stages 5-1, 5-2, . . . 5-m of the shift register 5 at the abovesaid moment. As a result of this, a signal of logic "0", that is, a coincidence signal, is outputted from that one of the exclusive OR gates 6-1, 6-2, . . . 6-m corresponding to that one of the shift register stages 5-1, 5-2, . . . 5-m which has stored therein the abovesaid address information. In this case, the other exclusive OR gates provide signals of logic "1", that is, non-coincidence signals. Accordingly, the non-coincidence detector circuit 7 produces a signal A of logic "0" and accessing to the designated logical storage 1-2 is not started. On the other hand, the AND gate 8 is turned off by the signal of logic "0" from the non-coincidence detector circuit 7 and the content of the abovesaid request for access from the priority control circuit 4 is not stored in the first stage 5-1 of the shift register 5. This information A is further sent to the priority control circuit 4. Thereafter, the priority control circuit 4 may operate to put the abovesaid request for access in the "wait" state or cause the abovesaid operations to be performed based on the request for access of the next priority level.

Then, when the address information of the designated logical storage 1-2 in its "busy" state is shifted to the right in the shift register 5 in synchronism with the clock signal, and is provided as overflow OVF from the last stage 5-m of the shift register 5, the logical storage 1-2 becomes idle. Under such conditions, if the request for access which designated the logical storage as described above is selected, the outputs from the exclusive OR gates 6-1, 6-2, . . . 6-m are all provided with logic "1" and the non-coincidence detector circuit 7 derives therefrom the signal A of logic "1". When the signal of logic "1" is thus derived from the non-coincidence detector circuit 7, the request for access is set in the first stage 5-1 of the shift register 5 through the AND gate 8 turned on by the signal of logic "1" from the detector circuit 7. At the same time as the signal of logic "1" is derived from the non-coincidence detector circuit 7, the memory access control system 2 formally accepts the abovesaid request for access to start accessing the designated logical storage 1-2.

The address requested for access, thus set in the first stage 5-1 of the shift register 5, is shifted sequentially from the first stage 5-1 to the following stages 5-2, 5-3, . . . 5-m in synchronism with the clock signal cl during accessing to the designated logical storage 1-2. And the abovesaid address is overflown as OVF from the last stage 5-m of the shift register 5 at the moment of completion of the accessing.

In the case of this invention, the shift register 5 stores therein information for identifying the accessing device corresponding to the designated logical storage in addition to the address information thereof. To this end, for example, in such a case of data read out for the designated logical storage, when data is read from the designated logical storage, the information for identifying the abovesaid accessing device is read from the last stage 5-m of the shift register 5, along with the address information of the designated logical stage. Based on the information for identifying the accessing device, the read-out data is sent to the accessing device.

Also, the content stored in a predetermined address of the main memory 1 can be partially rewritten easily and rapidly by utilizing the shift register 5. This will become apparent from the following description.

Figure 4:
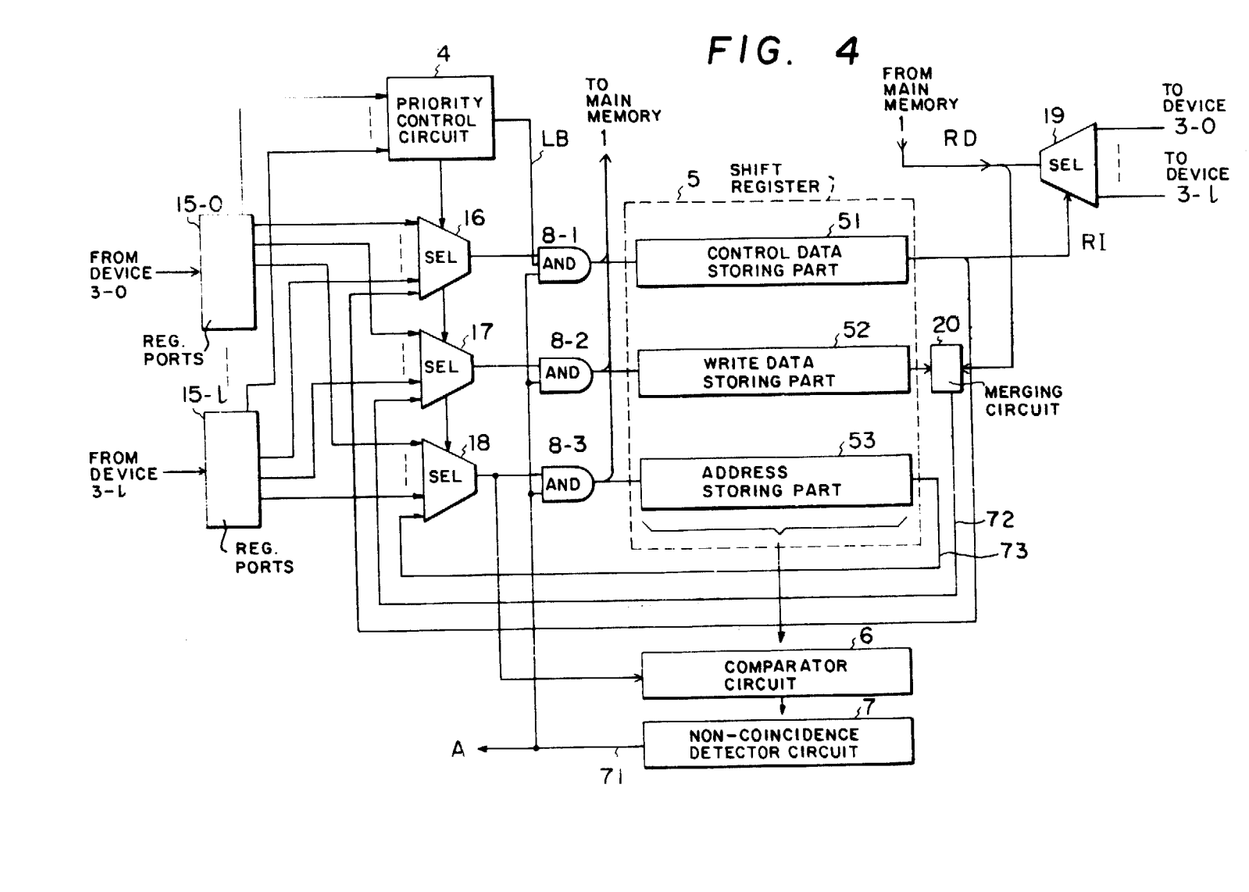
FIG. 4 is a block diagram illustrating an embodiment of the memory access control system according to this invention.

FIG. 4 illustrates in block diagram one embodiment of this invnetion, which is used as the memory access control system 2 shown in FIG. 1.

In FIG. 4, reference numerals 15-0 to 15-*l* indicate request (REQ. PORTS) provided respectively corresponding to accessing devices 3-0 to 3-*l*; 4 designates a priority control circuit; 16, 17 and 18 identify selectors (SEL); 8-1, 8-2 and 8-3 denote AND gates; 5 represents a shift register; 6 refers to a comparator circuit; 7 shows a non-coincidence circuit; 19 indicates a selector (SEL); and 20 designates a merging circuit.

When a request for access for write is issued from an accessing device such as a central processing unit (CPU) or channel processor (CHP), control data, write data and the address information of the memory to be accessed are sent from the accessing device, for instance, 3-0, to the request port 15-0 corresponding thereto.

The priority control circuit 4 detects the above request for access, and determines the priority level based on the relationships of the accessing device to the other accessing devices 3-1 to 3-*l*, permitting the accessing device of the highest priority level to access the memory. In this case, if the request port 15-0 is determined to be of the highest priority level, the priority control circuit 4 applies instructions to the selectors 16, 17 and 18 to select the request port 15-0 and the abovesaid data and information stored in the request port 15-0 are respectively derived at the output ends of the selectors 16, 17 and 18.

That is, the control data, the write data and the address information of the memory to be accessed are provided at the output sides of the selectors 16, 17 and 18, respectively. The address of this memory is transferred through the selector 18 to the comparator circuit 6, in which the memory address information stored in each stage of an address storing part 53 of the shift register 5 is compared with the address part of the logical storage LS. That is, a check is made to determine whether the logical storage LS in which the desired address exists is idle or not. The result of this comparison is detected by the non-coincidence detector circuit 7 and, when any of the register stages is not coincident with the abovesaid address part, that is, when the desired logical storage is not busy, the non-coincidence detector circuit 7 provides at its terminal 71 a signal of logic "1". As a result of this signal, the AND gates 8-1, 8-2 and 8-3 are opened to transfer therethrough the abovesaid data to the main memory 1 and, further, an access operation is started by a control signal ("1") fed via the point A to the memory 1. The information for identifying the accessing device is formed by the priority control circuit 4, and applied to the input side of the gate 8-1 through a signal line LB.

On the other hand, the inputs from the AND gates 8-1, 8-2 and 8-3 are respectively stored in first stages of a control data storing part 51, a write data storing part 52 and an address data storing part 53 of the shift register 5, and are each sequentially shifted to the last stage in synchronism with a clock pulse.

The number of stages of the shift register 5 is selected to correspond to the number of clock pulses produced in the cycle time of one access operation of the main memory 1. Accordingly, upon completion of the access operation, the aforementioned data overflows from the last stage of the shift register 5. In the case of write, when the data overflows from the shift register 5, the write is already completed.

Rewriting of a part of a word read from a memory, by one access operation for example, a word composed of 8 bytes, (desired one or more of the 8 bytes), is usually referred to as "partial write." In the case of partial write, the data stored in a designated address is read out, and is transferred to the merging circuit 20 through a read-out line RD from the main memory 1. On the other hand, partial write data overflows from the last stage of the write data storing part 52 of the shift register 5, and is similarly transferred to the merging circuit 20, in which the abovesaid data is merged in a pattern desired by the accessing device, and the output from the merging circuit 20 is applied again to the input side of the selector 17 via line 72. In a similar manner, the address data is also applied from the last stage of the address storing part 53 of the shift register 5 to the input side of the selector 18 via line 73. At this time, by the control data overflowing from the control data storing part 51 of the shift register 5, the priority control circuit 4 is controlled to inhibit requests from the ports 15-0 to 15-*l*, and at the same time, the selectors 16, 17 and 18 are caused to select the control data overflown from the shift register 5, the data from the merging circuit 20 and the aforementioned address data. The data is written in the main memory 1 at the abovesaid addresses in the same manner as in the case of a write operation.

In the case of a read operation, control data including the information for identifying the accessing device (for example, 3-1) overflows from the control data storing part 51 of the shift register 5, and reaches the selector 19 through a line RI to control the selector 19, selecting the accessing device (for instance, 3-0). Accordingly, the data read out from the main memory 1 is transferred to the accessing device, for example, 3-0, through a line RD and the selector 19.

Figure 5:
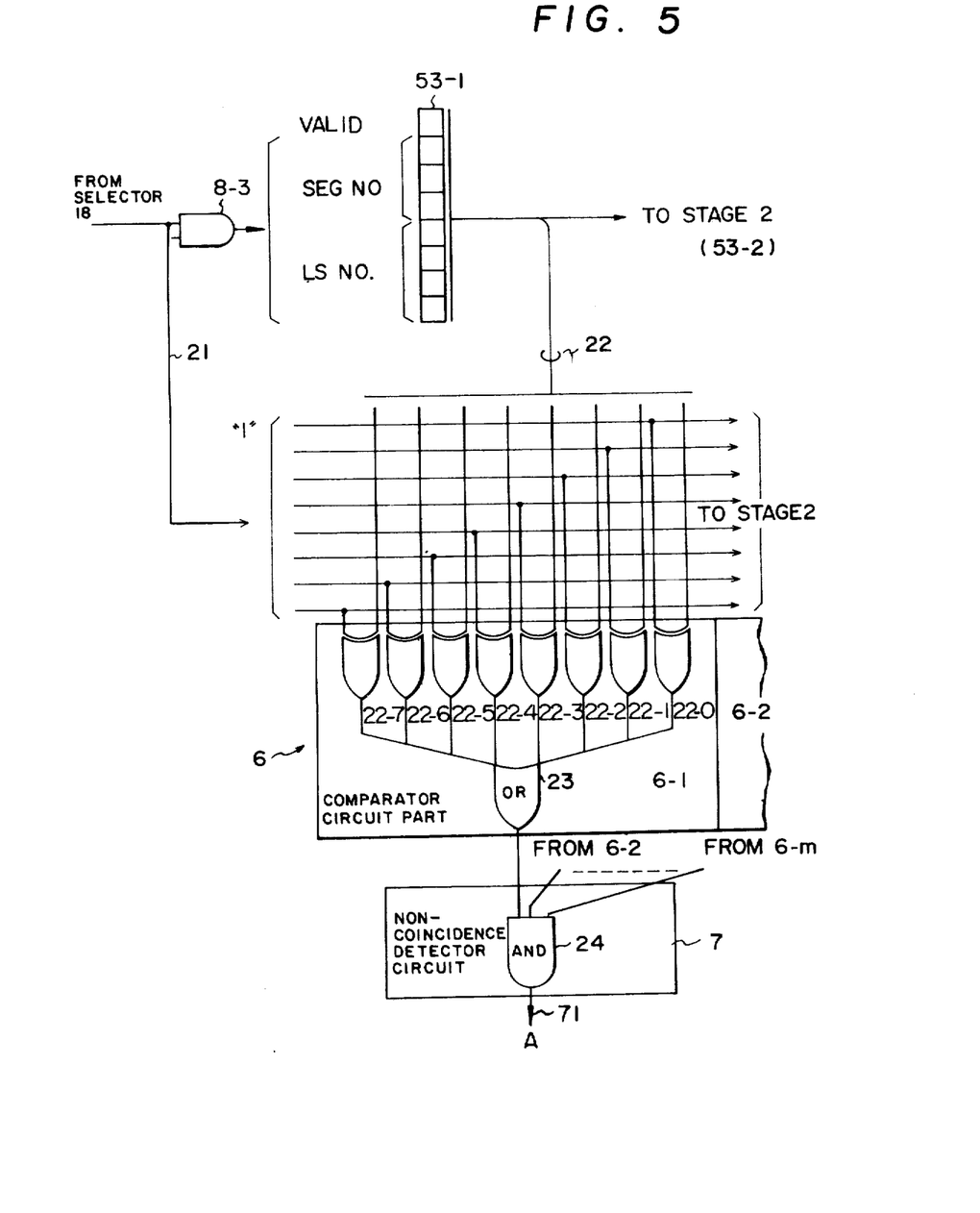
FIG. 5 is a connection diagram showing in detail a comparator circuit used in FIG. 4.

FIG. 5 is a block diagram showing in detail the address storing part 53 of the shift register 5, the comparator circuit 6 and the non-coincidence detector circuit 7 employed in the embodiment of FIG. 4.

In FIG. 5, reference numeral 53-1 indicates a first stage of the address storing part 53 of the shift register 5 (FIG. 4). In the illustrated example, the main memory 1 is divided, for instance, into eight segments, each having sixteen logical storages (LS). The logical storages of each segment are given the same address. Accordingly, identification of one logical storage requires the address (4-bit) of the logical storage itself and the address (3-bit) of the segment to which the logical storage belongs. It is necessary that the addresses of the abovesaid segment and logical storage and the address of the storage area of the logical storage be stored at each stage of the shift register 5. However, since this is not related directly to this invention, no more detailed description will be given. The address storing part 53 of the shift register 5 comprises *m* stages such as indicated by 53-1.

The output from each stage, which is indicative of the content of each cell, is provided to the comparator circuit 6, and compared with the address of the logical storage desired to be accessed, which is introduced from the selector 18. In FIG. 5, only a comparator part 6-1 for the first stage is shown. Reference numeral 21 indicates a data line for address transfer from the selector 18 to the comparator circuit 6; 22 designates a data line through which the content of each cell of the first stage is transferred. The two data lines serve as two corresponding inputs to each of the exclusive OR gates 22-0 to 22-7. Accordingly, when the two inputs to each exclusive OR gate are coincident with each other (that is, each is "1" or "0"), the output from the exclusive OR gate is "0", and in the case of non-coincidence, the output is "1". The outputs from the exclusive OR gates 22-0 to 22-7 are applied to the OR gate 23. Accordingly, when the two inputs to each of the exclusive OR gates 22-0 to 22-7 are coincident with each other, the outputs from the exclusive OR gates are all "0", and if not, the output from the OR gate 23 is "1".

The comparator part 6-1, formed with the exclusive OR gates 22-0 to 22-7 and the OR gate 23, is provided for each stage of the address storing part 53 of the shift register 5. These comparators 6-1 to 6-m (only 6-1 is shown) form the comparator circuit 6.

The non-coincidence circuit 7 is formed with an AND gate 24 having m inputs, and the outputs from the comparator parts 6-1 to 6-m are applied to the AND gate 24. Accordingly, if the pairs of corresponding inputs in at least one of the comparator parts 6-1 to 6-m are all coincident and if the output from the comparator part is "0", the output from the AND gate 24 (that is, the output 71 from the non-coincidence detector circuit 7) is "0". If at least one of the pairs of inputs is not coincident in all of the comparator parts 6-1 to 6-m and if their outputs are all "1", the output 71 from the non-coincidence detector circuit 7 is "1".

In the case of a request for access to a memory from a certain accessing device, the address data desired to be accessed is transferred from the selector 18 to the comparator circuit 6 through the line 21, as described previously in connection with FIG. 4. This address data is compared with the address data stored in each stage of the address storing part 53 of the shift register 5, as described previously with regard to FIG. 5. In the case of no data being coincident, one with the other, the logical storage of the above address is not busy and the output from the non-coincidence detector circuit 7 is "1", so that the accessing operation takes place, as set forth with respect to FIG. 4.

However, when the part of the address data determining the logical storage inputted to the comparator circuit 6 from the data line 21 coincides with the part of the address data determining the logical storage stored in one of the stages of the address storing part 53 of the shift register 5, the abovesaid logical storage is busy and new accessing should be prevented. In this case, since the output 71 from the non-coincidence detector circuit 7 is "0", the AND gates 8-1, 8-2 and 8-3 shown in FIG. 4 are not opened. Further, since the output A is also "0", accessing to the abovesaid logical storage is prevented. In the case of an actual request for access, a valid bit "1" is added to the address data of the request to indicate its validity.

In the memory access control system of this invention, a shift register is provided which shifts in synchronism with a clock signal and the number of stages of the shift register is selected so that the time necessary for shifting the stored content from first to last stages of the shift register may correspond to the memory access time. At the moment of requesting an access to a memory of a certain address, the address is stored in the first stage of the shift register, and sequentially shifted to the subsequent stages in synchronism with the clock signal. Since the address is shifted to the second stage after one clock signal, the address of another memory access can be stored in the first stage. Consequently, a new memory access can be executed at each clock signal and the addresses of the memory accesses during execution are all stored in any stages of the shift register, so that it is possible to check whether the logical storage is busy or not.

Further, it is disadvantageous to provide, to each logical storage, a control circuit for checking its status for accessing, as in the prior art. That is, where the number of logical storages is larger than a certain value, for example, eight to sixteen, a required number of control circuits increases in proportion to the number of logical storages used and the scale of the memory access control system is inevitably enlarged. In the present invention, however, even if the number of logical storages increases, the scale of the memory access control system remains unchanged.

Moreover, in the memory access control system of this invention, a control of transfer of read-out data to an accessing data to device can easily be achieved with a small number of additional devices, and partial write can also be carried out easily.

Numerous changes may be made in the above described system and different embodiments of the invention may be made without departing the spirit thereof; therefore, it is intended that all matter contained in the foregoing description and in the accompanying drawings shall be interpreted as illustrative and not in a limiting sense.

What is claimed is:

1. A memory access control system for controlling access by at least one accessing device of a main memory of a given cycle time in accordance with a clock signal, and which includes a plurality of independently accessible logical storages, said memory access control system comprising:
    means for receiving, from said at least one accessing device, a request for access to one of said logical storages designated by a given address;
    means for receiving address information of those logical storages which are busy being accessed;
    shift register means including a plurality of register stages corresponding in number to the given cycle time of the main memory for storing said address information those logical storages which are busy being accessed and for sequentially shifting the stored content in synchronism with said clock signal; and
    comparator circuit means for comparing the content of each stage of the shift register means with said given address of the logical storage designated by the access request from the accessing device, and responsive thereto, when there is no coincidence between the content of each stage of the shift register means and said given address, to generate a control signal for accessing the designated logical storage.

2. The memory access control system according to claim 1, which further comprises a non-coincidence detector circuit means operatively associated with said comparator circuit means for detecting non-coincidence as a result of comparison of the contents of all stages of the shift register means with the given address designated by the access request, and generating a control signal for accessing the designated logical storage.

3. A memory access control system for controlling access by at least one accessing device of a main memory of a given cycle time in accordance with a clock signal, and which includes a plurality of independently accessible logical storages, said memory access control system comprising:

means for receiving, from said at least one accessing device, a request for access to one of said logical storages designated by a given address, and identification information identifying the accessing device from which the access request is received;

means for receiving address information of those logical storages which are busy being accessed;

shift register means including a plurality of register stages corresponding in number to the given cycle time of the main memory for storing said address information of those logical storages which are busy being accessed and said identification information of the accessing device having generated the access request, and for sequentially shifting the stored contents in synchronism with said clock signal;

comparator circuit means for comparing the address information of the logical storage stored in each stage of the shift register means with the given address of the logical storage designated by the access request from the accessing device, and responsive thereto, when there is no coincidence between the content of each stage of the shift register means and said given address, to generate a control signal for accessing the designated logical storage; and     control means for transferring data read out from the given address of the corresponding logical storage to the accessing device identified by the identification information of the accessing device stored in the shift register means.

4. A memory access control system for controlling access by at least one accessing device of a main memory of a given cycle time in accordance with a clock signal, and which includes a plurality of independently accessible logical storages, said memory access control system comprising:

means for receiving, from said at least one accessing device, a request for access to one of said logical storages designated by a given address;

means for receiving address information of those logical storages which are busy being accessed;

shift register means including a plurality of register stages corresponding in number to the given cycle time of the main memory for storing said address information of those logical storages which are busy being accessed for storing partial write data, and for sequentially shifting the stored contents in synchronism with said clock signal causing overflow of said partial write data;

comparator circuit means for comparing the address information of the logical storage stored in each stage of the shift register means with the given address of the logical storage designated by the access request from the accessing device, and responsive thereto, when there is no coincidence between the content of each stage of the shift register means and said given address, to generate a control signal for accessing the designated logical storage to read out data stored therein;

merging circuit means for merging the partial write data overflown from the shift register means and data read out from the given address of the logical storage to form merged data; and     control means for writing the merged data in the given address of the main memory as for an ordinary write operation.

5. In a data processing system comprising a main memory of a given cycle time in accordance with a clock signal, and which includes a plurality of independently accessible logical storages, the system further comprising at least one accessing device which generates access requests defining a given address of a selected one of said logical storages to which access is requested; a memory access control system responsive to received address information of those logical storages currently being accessed, and to said access requests, for controlling access by said at least one accessing device to said given address of said selected one of said logical storages, said memory access control system comprising:

shift register means of a fixed number of stages corresponding to said given cycle time for storing and sequentially shifting, in synchronism with said clock signal, said address information of those logical storages currently being accessed;

comparator means for comparing each address information stored in each stage of said shift register means with said given address of said selected one of said logical storages, and generating corresponding comparison signals alternatively indicating coincidence and non-coincidence; and     control means for detecting when all of said comparison signals indicate non-coincidence and responsive thereto for permitting access to said selected one of said logical storages by said at least one accessing device.

6. In a data processing system according to claim 5 including priority control means responsive to a predetermined priority scheme for said accessing devices, and to said access request from said at least one accessing device for establishing a priority level for each said access request in accordance with said priority scheme, whereby said at least one access request is prioritized for memory control purposes.

7. In a data processing system according to claim 6 wherein said priority control means is responsive to non-detection, by said control means, of all of said comparison signals indicating non-coincidence for holding said corresponding at least one access request in a "wait" state.

8. In a data processing system according to claim 5 including input means for receiving said at least one access request and responsive to non-detection by said control means, of all of said comparison signals indicating non-coincidence for holding said corresponding at least one access request in a "wait" state.

9. In a data processing system according to claim 5 wherein said at least one accessing device transmits, as a part of said access request, address information identifying said logical storage to be accessed, and said shift register means includes an address storing part for receiving and storing said address information, said address information being read therefrom when said control means detects all of said comparison signals indicating non-coincidence.

10. In a data processing system according to claim 5 wherein said at least one accessing device transmits write data to be written into said selected one of said logical storages as a part of said access request, and said shift register means includes a write data storing part for receiving and storing said write data.

11. In a data processing system according to claim 5 wherein said at least one accessing device transmits, as a part of said access request, partial write data to be merged with data already stored in said given address of said selected one of said logical storages, to form merged data to be subsequently restored therein, said shift register means including a write data part for holding said partial write data, said memory access control system including merging circuit means for merging said partial write data from said write data part and said data already stored from said selected one of said logical storages to form said merged data.

12. In a data processing system according to claim 5, wherein said at least one accessing device transmits, as a part of said access request, control information identifying said at least one accessing device, and said shift register means includes a control data storing part for receiving and storing said control information, said system including further control means responsive to said control information for transferring data from said main memory to said at least one accessing device.

* * * * *